United States Patent [19]

Ogawa

[11] Patent Number: 5,572,251
[45] Date of Patent: Nov. 5, 1996

[54] OPTICAL POSITION DETECTING UNIT AND OPTICAL COORDINATE INPUT UNIT

[75] Inventor: Yasuji Ogawa, Saitama-Ken, Japan

[73] Assignee: Wacom Co., Ltd., Saitama-Ken, Japan

[21] Appl. No.: 330,457

[22] Filed: Oct. 28, 1994

[30] Foreign Application Priority Data

Mar. 17, 1994 [JP] Japan ................................ 6-072553

[51] Int. Cl.$^6$ ................................................ H04N 5/225
[52] U.S. Cl. ....................... 348/207; 348/141; 345/180
[58] Field of Search ...................... 348/744, 61, 15, 348/143, 141, 169, 207; 345/145, 157, 158, 180, 181, 179

[56] References Cited

U.S. PATENT DOCUMENTS

| | | | |
|---|---|---|---|
| 3,951,550 | 4/1976 | Slick | 356/141 |
| 4,092,072 | 5/1978 | Ellis | 356/152 |
| 4,209,254 | 6/1980 | Reymond et al. | 356/152 |
| 4,550,250 | 10/1985 | Mueller et al. | 250/203 R |
| 4,591,841 | 5/1986 | Gunderson et al. | 345/180 |
| 4,946,277 | 8/1990 | Marquet et al. | 356/141 |
| 5,051,736 | 9/1991 | Bennett et al. | 345/180 |
| 5,138,304 | 8/1992 | Bronson | 348/141 |
| 5,148,016 | 9/1992 | Murakami et al. | 250/221 |
| 5,166,668 | 11/1992 | Aoyagi | 345/180 |
| 5,187,467 | 2/1993 | Myers | 345/180 X |
| 5,298,737 | 3/1994 | Proper | 250/221 |

*Primary Examiner*—Wendy Garber
*Attorney, Agent, or Firm*—Lowe, Price, LeBlanc & Becker

[57] ABSTRACT

An optical position detecting unit which includes: an image pickup device having a pixel array region, an imaging lens for forming an image of a light-emitting point, a converging lens for converging light come from the light-emitting point image formed by the imaging lens onto the pixel array region, a pattern member having a pattern which contains code information uniquely corresponding to the position of the light-emitting point and disposed on a path of light from the light-emitting point and at a position near the light-emitting point image, and a signal processing unit for extracting information of the position of the light-emitting point by using code information contained in an image of the pattern projected onto the pixel array region of the image pickup device on the basis of image data generated by the image of the projected pattern.

24 Claims, 8 Drawing Sheets

OPTICAL POSITION DETECTING UNIT AND OPTICAL COORDINATE INPUT UNIT

BACKGROUND OF THE INVENTION

1. Field of the Invention

The present invention relates to an optical position detecting unit and an optical coordinate input unit formed by using the optical position detecting unit. In the optical position detecting unit, an image pickup device having a pixel array region, such as a charge coupled device (CCD) image sensor, is used so that not only the number of pixels in the image pickup device can be reduced but also the detecting resolution thereof can be improved.

2. Description of the Related Art

As a conventional optical position detecting unit, there is known a configuration which includes an image pickup device (such as a television camera or the like) having a pixel array region (image pickup region) constituted by a plurality of pixels and a movable body having a point-like light source. In the configuration, the image pickup device picks up an image of the light source of the movable body to obtain an image pickup signal so that the position of the movable body is measured optically through image processing of the image pickup signal. A CCD image sensor is used as the image pickup device.

In order to improve the accuracy of a position measured by the conventional optical position detecting unit, it is necessary to improve the resolution of the image pickup device. In order to improve the resolution of the image pickup device, it is necessary to increase the number of pixels in the CCD image sensor greatly. However, it is difficult to increase the number of pixels in the CCD image sensor greatly because a manufacturing cost rises.

SUMMARY OF THE INVENTION

An object of the present invention is to provide an optical position detecting unit and an optical coordinate input unit which are intended to improve the resolution relative to the number of pixels in an image pickup device having a pixel array region.

The optical position detecting unit according to the present invention includes an image pickup device having a pixel array region, an imaging lens for forming an image of a light-emitting point, a converging lens for converging light come from on the light-emitting point image formed by the imaging lens onto the pixel array region, a pattern member having a pattern which contains code information uniquely corresponding to the position of the light-emitting point and being disposed on a path of light from the light-emitting point and at a position near the light-emitting point image, and a signal processing unit for extracting information of the position of the light-emitting point by using code information contained in an image of the pattern projected onto the pixel array region of the image pickup device by processing image data generated on the basis of the image of the projected pattern.

In the aforementioned configuration, preferably, the converging lens is disposed so that an image of the image pickup device formed by the converging lens is located at the position of the imaging lens.

In the aforementioned configuration, preferably, a masking member for determining a portion of the pattern which contains the code information corresponding to the position of the light-emitting point is disposed near the pattern member. Further, preferably, the masking member includes a visual field of variable position type for setting the pattern portion, which is used for detecting the light-emitting point. Further, preferably, the masking member is located at a position where the image of the light-emitting point is to be formed.

In the aforementioned configuration, preferably, the pattern has two-dimensional M-sequence characteristic. Particularly, the pattern is constituted by two types of pattern elements, namely, circular dot type pattern elements and ring-like dot type pattern elements, which are arranged in positions of intersections of a lattice in a specific sequence.

The optical coordinate input unit according to the present invention includes any one of the aforementioned optical position detecting units, a display screen, and a light emitting unit for generating a light-emitting point on the display screen, wherein the optical position detecting unit is disposed to face the display screen at a certain distance from the display screen, and data about the position of the light-emitting point detected by the optical position detecting unit are transferred to a computer.

In the optical position detecting unit or optical coordinate input unit according to the present invention, the imaging lens, the converging lens and the CCD image sensor are arranged in predetermined positional relations, and at the same time, the pattern member on which a pattern partly containing code information uniquely corresponding to the position of a light-emitting point is drawn is arranged near an image of the light-emitting point formed by the imaging lens, so that the position of the light-emitting point can be obtained through image processing on the basis of an image of a part of the pattern projected onto the pixel array region (image pickup region) of the CCD image sensor. In spite of a small number of pixels, high detecting resolution can be realized by using the imaging lens and the converging lens arranged in a predetermined positional relation and by using the specific pattern drawn on the pattern member and having two-dimensional M-sequence characteristic. In addition, the influence of background light is reduced by the masking member.

DESCRIPTION OF THE PREFERRED EMBODIMENTS

Embodiments of the present invention will be described below with reference to the accompanying drawings.

Figure 1:
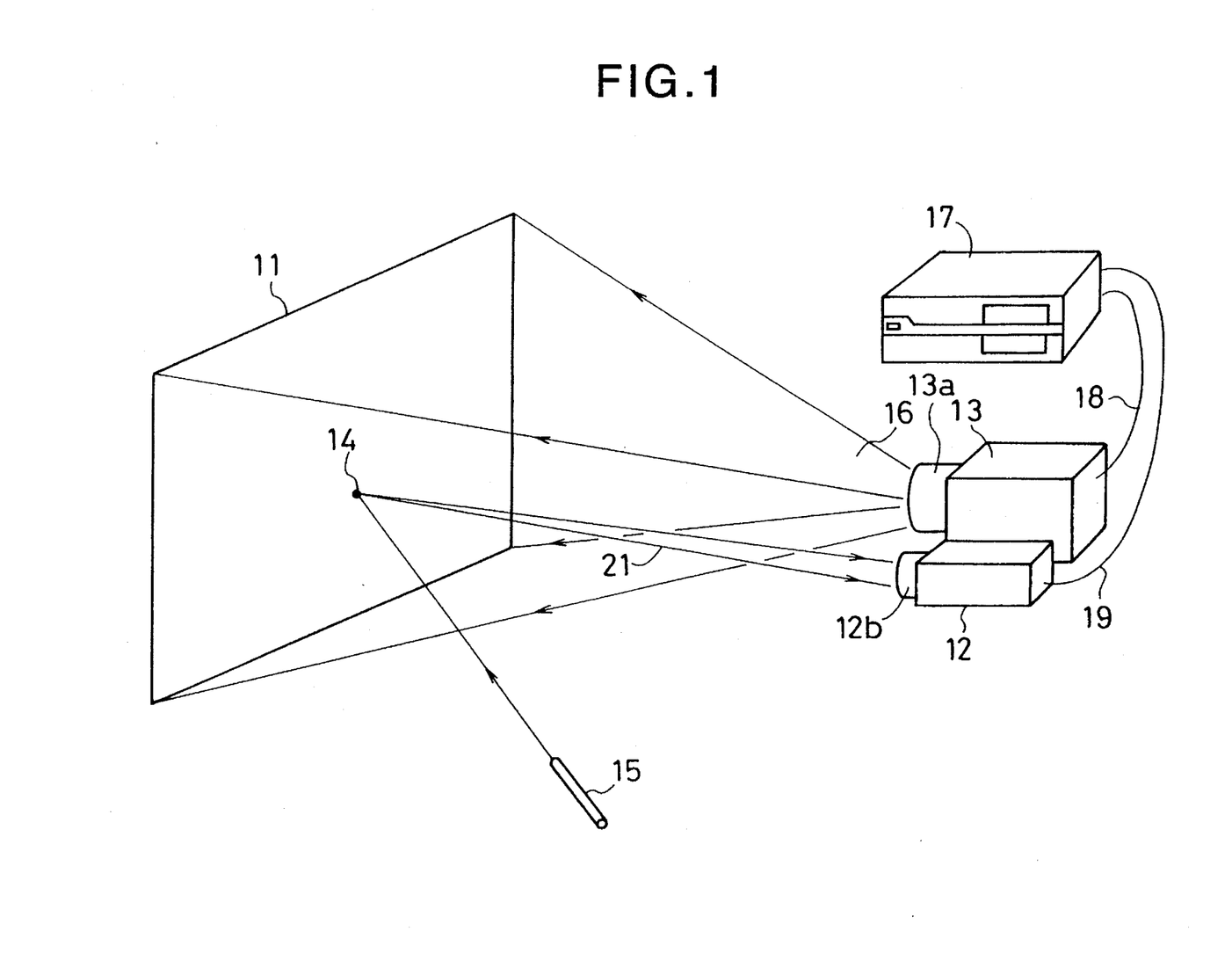
FIG. 1 is a diagram of an optical coordinate input unit according to a preferred embodiment of the present invention.

FIG. 1 is a schematic diagram of an input system for a computer using an optical position detecting unit according to the present invention. The optical coordinate input unit includes: a screen 11; an optical position detecting unit 12 and a projection type display unit 13 which are disposed in front of the screen 11; and a laser pointer 15 for generating a light point 14 on the screen 11. The position of the light point 14 on the screen 11 is a position to be detected. This position is designated by an operator who operates the laser pointer 15. A projecting portion 13a of the projection type display unit 13 faces the screen 11 and performs necessary display on the screen 11 through projected light 16. A light take-in portion 12a of the optical position detecting unit 12 faces the screen 11 to receive light from the light point 14 on the screen 11 and the optical position detecting unit 12 detects the position (coordinate data) of the light point 14 on the basis of an optical theory and an arithmetic operation process both of which will be described later. A computer unit 17 such as a personal computer supplies the projection type display unit 13 with data with respect to contents to be displayed on the screen 11 through a CRT cable 18. Further, the computer unit 17 is supplied with data of the position of the light point 14 from the optical position detecting unit 12 through an RS232C cable 19. The computer unit 17 performs necessary data processing by using the position data thus supplied.

In the aforementioned configuration, the distance between the screen 11 and the optical position detecting unit 12 is kept in a predetermined constant value while the configuration is used as a position data input system. The laser pointer 15 is operated by an operator. The light point 14 generated by the laser pointer 15 can be moved freely on the screen 11. If the light point 14 exists in a region which has been set as a visual field of the optical position detecting unit 12 on the screen 11, the position of the light point 14 can be detected by the optical position detecting unit 12.

Although FIG. 1 is an illustration of the configuration in which the optical position detecting unit 12 detects the light point 14 as light reflected on the screen 11, the light point 14 may be formed by light transmitted from the back of the screen 11 or by light self-emitted from a substance per se equivalent to the screen.

As the projection type display unit 13, a conventionally known unit is used. As the laser pointer 15, it is preferable to use a laser pointer capable of emitting both infrared light and visible light. The internal configuration of the optical position detecting unit 12 which is a feature portion of the present invention will be described below in detail.

Figure 2:
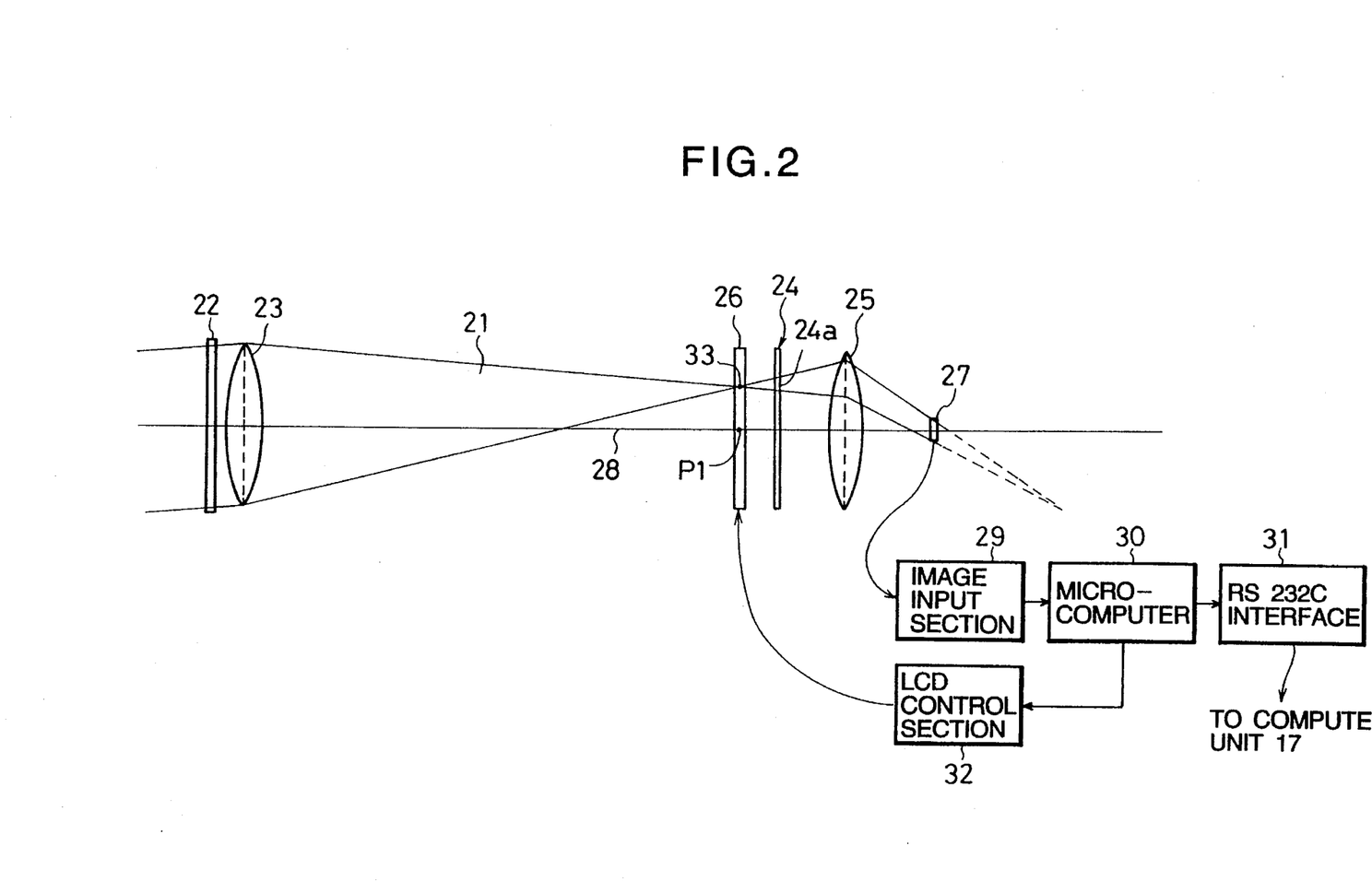
FIG. 2 is a diagram of the structure of a main part of the optical position detecting unit.

FIG. 2 is a schematic diagram of the structure of a main part of the optical position detecting unit 12. The main part includes an optical section and another section related to signal processing and control. The reference numeral 21 designates a path of light come from the light point 14 (FIG. 1) when the light point 14 is used as a light source.

The optical section is constituted by a filter 22, an imaging lens 23, a pattern plate 24, a converging lens 25, an LCD (liquid crystal display) mask 26 and a CCD image sensor 27. The filter 22 operates to extract laser light selectively from the light come from the light point 14. In this embodiment, an image of the light point 14 is formed in front of the pattern plate 24 by the imaging lens 23. The LCD mask 26 is preferably disposed at a position (the position of point P1 on an axis 28) where the image of the light point is formed by the imaging lens 23. The LCD mask 26 is a masking member which partly generates a movable light transmission portion (a portion equivalent to the window as will be described later) by using the light transmitting function or light shielding function of a liquid crystal to thereby transmit the light 21. The distance between the optical position detecting unit 12 and the screen 11 is kept in a sufficient value so that parallel rays of light enter the imaging lens 23. The position of the image of the light point 14 formed by the imaging lens 23 is kept in the same position on the axis 28 even when the light point 14 moves on the screen suitably. The position of the LCD mask 26 is determined in accordance with the position of the image of the light point formed on the axis 28.

In the above description, the imaging lens 23, the converting lens 25 and the CCD image sensor 27 are arranged in accordance with the positional relations which satisfy the imaging relation that the image of the CCD image sensor 27 formed by the converging lens 25 is located at the position of the imaging lens 23.

The section related to signal processing and control is constituted by an image input section 29, a microcomputer 30, an RS232C interface 31 and an LCD control section 32. The image input section 29 receives signals of respective pixels outputted from the CCD image sensor 27. Signals outputted from the RS232C interface 31 are supplied to the computer unit 17. The LCD control section 32 controls the movement of the light transmission portion of the LCD mask 26 on the basis of an instruction given from the microcomputer 30.

In FIG. 2, an imaged-point 33 formed by the imaging of the light point 14 is regarded as a point light source from the point of view of image formation by the imaging lens 23. When the light transmission portion is present in a place where the imaged-point 33 is formed in the LCD mask 26, the light 21 coming from the light point 14 passes through the locating of imaged-point 33 and a region 24a of the pattern plate 24 so as to enter the converging lens 25. The light 21 is converged by the converging lens 25 and radiated onto a light-receiving region (image pickup region) of the CCD image sensor 27. The light-receiving region of the CCD image sensor 27 is constituted by a two-dimensional region (plane) in which a plurality of pixels are arranged.

As shown in FIG. 2, the pattern plate 24 is disposed between the imaged-point 33 and the converging lens 25. A required pattern (which will be described later) having a light-shielding function is drawn in the pattern plate 24. Because light passes through the region of a part of the pattern plate 24 and enters the converging lens 25, the pattern drawn in the region (partial pattern) is projected onto the light-receiving region of the CCD image sensor 27. In the case where the pattern has a light-shielding function, the shadow of the pattern (a part of the pattern drawn in the pattern plate) is formed in the light-receiving region. The plurality of pixels arranged in the light-receiving region of the CCD image sensor 27 output signals detected in accordance with the projected pattern image. The image signals detected by the respective pixels of the CCD image sensor 27 are supplied to the image input section 29 successively.

Figure 3:
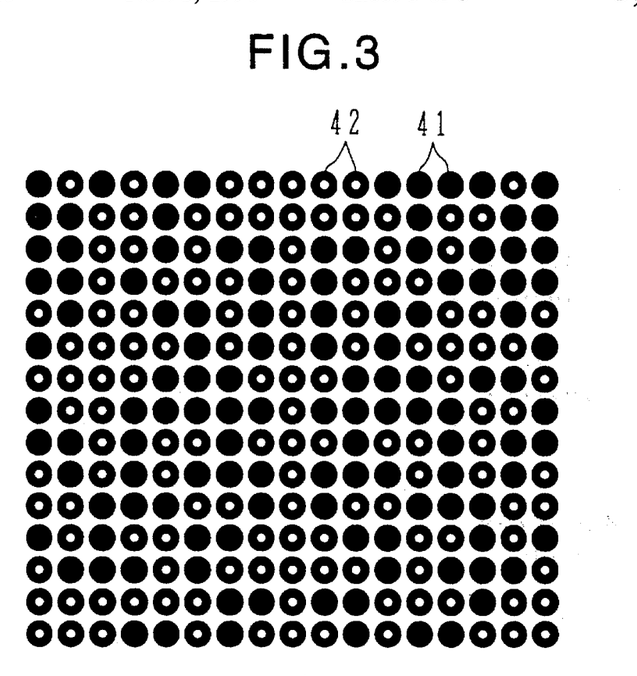
FIG. 3 is a view of an exemplary pattern in the structure of FIG. 2.
Figure 4:
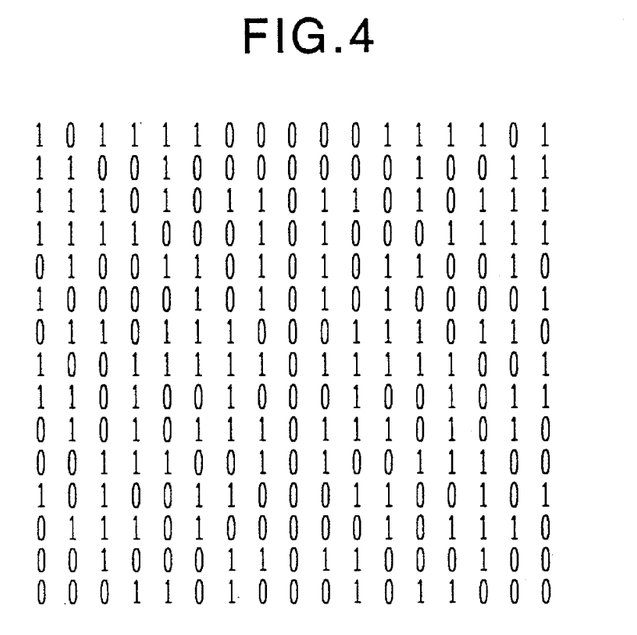
FIG. 4 is a view of replacement of the pattern by an arrangement of codes 0 and 1.

FIG. 3 shows an example of the pattern as a light-shielding portion drawn in the pattern plate 24. As is clear from the enlarged views (FIGS. 5A and 5B), the pattern is constituted by a plurality of dots (pattern elements each of which is smeared all over so as to function as a light-shielding portion) 41 and a plurality of ring-like dots (donut-shaped pattern elements) 42 arranged in lattice mode on the basis of a required arrangement pattern. The pattern shown in FIG. 3 is expressed in terms of code as shown in FIG. 4. In this embodiment, each of the dots 41 is expressed as code "1", and each of the ring-like dots 42 is expressed as code "0". The arrangement of codes shown in FIG. 4 is called "M-plane code". The M-plane means a plane having a two-dimensional M-sequence (Maximum length sequence, M period sequence) formed by extending an M-sequence pattern to a two-dimensional plane. The M-sequence is a code sequence widely used in the field of communication technique or the like. For example, in the case of a one-dimensional M-sequence with the length of $2^n-1$ bits as a period, the M-sequence is such a code sequence that the position of an arbitrary code of $\underline{n}$ continuous digits picked out is determined uniquely as a certain position on the whole of the pattern. Accordingly, the code (the code of the pattern formed by the dots 41 and the ring-like dots 42 which are pattern elements) contained in a partial region of the M-plane has a random characteristic and has such characteristic that the code is determined uniquely in accordance with the position of the partial region.

Figure 5A:
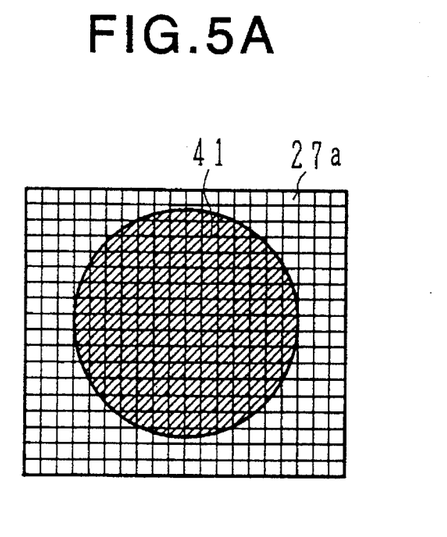
FIG. 5A is an enlarged view of the code "1"
Figure 5B:
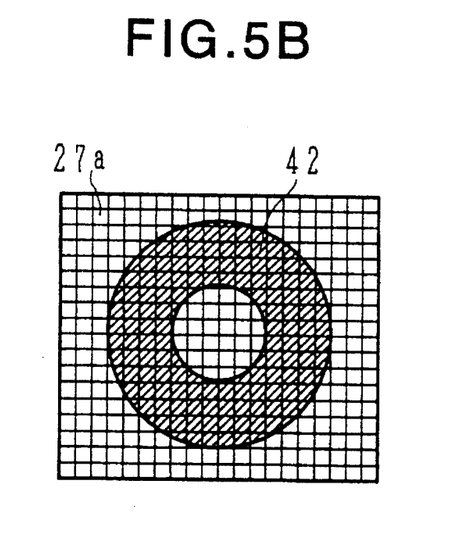
FIG. 5B is an enlarged view of the code "0"
Figure 6:
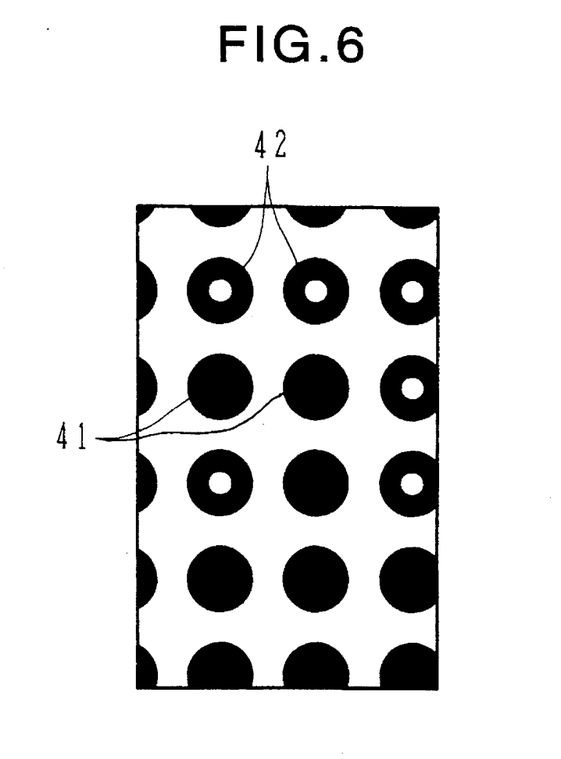
FIG. 6 is a view of a part of the pattern projected onto the image pickup region.

FIG. 6 is a diagram of an exemplary image picked up by the CCD image sensor 27, that is, a part of the pattern drawn in the pattern plate 24. In this manner, the shadow of a part of the pattern is projected onto the light-receiving region of the CCD image sensor 7. As shown in FIG. 6, the image picked up by the CCD image sensor 27 includes eight perfect-form pattern elements inclusive of dots 41 and ring-like dots 42, on the basis of the relation between the accuracy (fineness) in arrangement of the pattern shown in FIG. 3 and the area of the light-receiving region of the CCD image sensor 27, and on the basis of the area of the light transmission portion of the LCD mask 26. Code information determined in accordance with the position of the light point 14 can be obtained uniquely on the basis of the eight perfect-form pattern elements inclusive of dots 41 and ring-like dots 42. FIG. 5A is an enlarged view of one of the dots 41, and FIG. 5B is an enlarged view of one of the ring-like dot 42. The fine grating patterns in FIGS. 5A and 5B show conditions of arrangement of pixels 27a constituting the light-receiving region of the CCD image sensor 27.

Figure 7A:
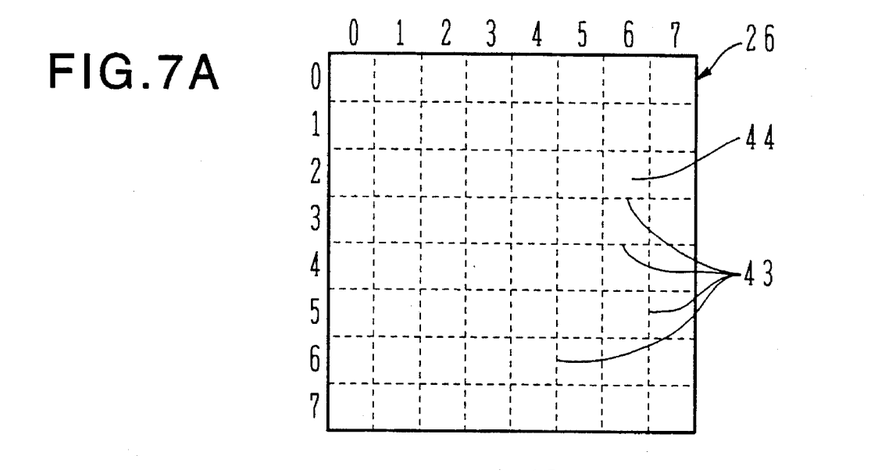
FIGS. 7A, 7B and 7C are views useful for describing how an LCD mask aperates.

The structure of the LCD mask 26 and the LCD mask 26 controlling operation of the LCD control section 32 will be described below. Background light is removed by the LCD mask 26. FIG. 7A is a front view of the LCD mask 26. For example, the LCD mask 26 is divided (by the broken lines 43) into 8 segments lengthwise and into 8 segments widthwise, so that 64 unit partitions 44 are formed. Hereinafter, the unit partitions 44 will be called "pixels in the LCD". In the LCD mask 26, light-transmitting portions (ON portions) and light-shielding portions (OFF portions) can be formed one by one with respect to the pixels 44 on the basis of control signals given from the LCD control section 32. The control signals from the LCD control section 32 are given one by one with respect to the pixels 44.

Figure 7B:
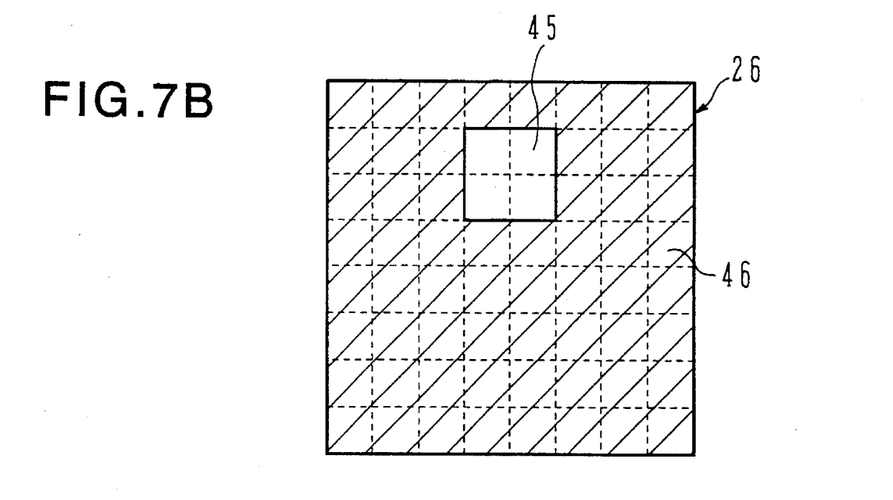
Figure 7C:
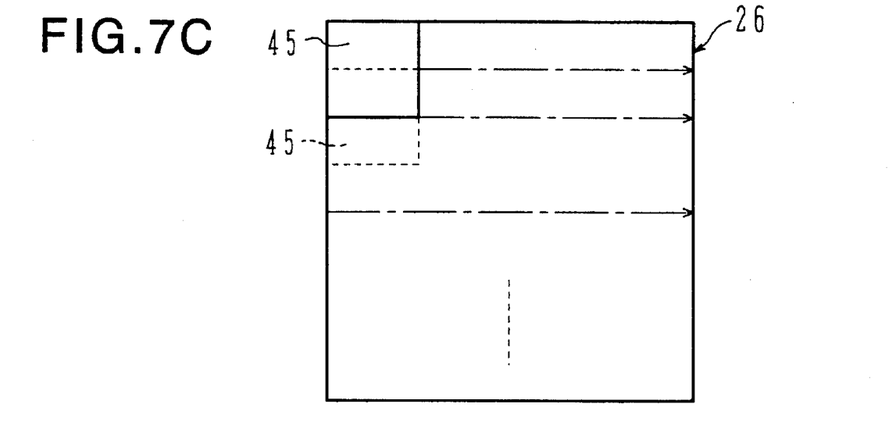

FIG. 7B is an illustration of the LCD mask in use. The reference numeral 45 designates a window for transmitting the light 21. The window 45 is shaped like a regular square by four pixels 44 in a light-transmitting state (ON state). The pixels 46 other than the pixels constituting the window 45 are in a light-shielding state (OFF state). As shown in FIG. 7C, the window 45 formed in the LCD mask 26 is moved on the basis of the control signals so that for example a scanning operation from top to bottom is repeated.

Position detection by the optical position detecting unit having the aforementioned configuration will be described below.

A light point 14 to be detected is displayed on the screen 11 by the laser pointer 15. Light 21 reflected from the light point 14 enters the optical position detecting unit 12. The light 21 incident to the optical position detecting unit 12 is imaged in the setting position of the LCD mask 26 by the imaging lens 23 after passing through the filter 22. At the same time, the light 21 passes through the light-transmitting portion (window 45) formed in the LCD mask 26 and is converged by the converging lens 25 so as to be radiated onto the light-receiving portion of the CCD image sensor 27. Because the light 21 passes through a partial region of the pattern plate 24 disposed in front of the converging lens 25, a part of the pattern in the partial region is projected as a shadow onto the light-receiving region of the CCD image sensor 27. The partial region of the pattern plate 24 corresponds to the position of the light point 14.

FIG. 6 is a diagram of an image with respect to a part of the pattern picked up by the CCD image sensor 27. The shown image has a pattern containing perfect-form (fault-less-form) pattern elements, eight in total number, of dots 41 and ring-like dots 42 in combination.

Referring to the flow chart of FIG. 8, the operation control of the LCD control section 32 at the LCD mask 26 will be described below. The control procedure in the flow chart is carried out by the microcomputer 30.

A pixel 44 in the LCD mask 26 shown in FIG. 7A is generally expressed as pixel [i, j]. In FIG. 7A, $\underline{i}$ represents the line number in a numerical range of from 0 to 7; $\underline{i}$ represents the column number in a numerical range of from 0 to 7. In step S11, the respective numbers $\underline{i}$ and $\underline{j}$ are set to i=0 and j=0. In the next step S12, all the pixels in the LCD mask 26 are switched off so as to be in a perfect light-shielding state. In step S13, for example, four elements constituting the window 45, that is, pixels [i, j], [i+1, j], [i, j+1] and [i+1, j+1] are switched on. Because the relation i=j=0 holds in this case, the window 45 is formed at the left upper corner as shown in FIG. 7C. When the window 45 is formed at the left upper corner, an image obtained by the CCD image sensor 27 is inputted through the image input section 29 so that the mean brightness thereof is calculated and stored in a storage section (step S14). Although the case where the mean brightness is calculated has been described as an example, it is possible to use such calculation that output signals of light-receiving elements arranged in the light-receiving region are added up simply.

In steps S15 and S16, $\underline{i}$ is increased by one unless $\underline{i}$ reaches 7, so that the procedure of the steps S12, S13 and S14 is repeated with respect to each value of $\underline{i}$. That is, the window 45 moves right by one-pixel's distance successively on the LCD mask 26, so that the mean brightness of the image detected by the CCD image sensor 27 is obtained with respect to each position of the window 45. When i=7 is proved in the step S16, steps S17 and S18 are carried out. By these steps, the window 45 moves to the left end and moves down by one-pixel's distance. Then, the steps S12 to S16 are repeated to move right the window 45 by one-pixel's distance successively, so that the mean brightness of the image detected by the image sensor 27 is obtained with respect to each position of the window 45. When the window 45 reaches the right end, the steps S17 and S18 are carried out again so that the window 45 moves to the left end and moves down by one-pixel's distance.

As described above, the window 45 moves to carry out the scanning operation on the whole surface of the LCD mask 26 as shown in FIG. 7C. In the microcomputer 30, values of mean brightness with respect to the window 45 in all positions in the LCD mask 26 are calculated. In step S19, the maximum value of mean brightness is retrieved from the all data of mean brightness obtained, and the all pixels are ON/OFF-controlled so that the window 45 having the maximum value of mean brightness can be formed. The position of the window 45 thus formed corresponds to a place where the imaged-point 33 of the light point 14 is formed.

Figure 8:
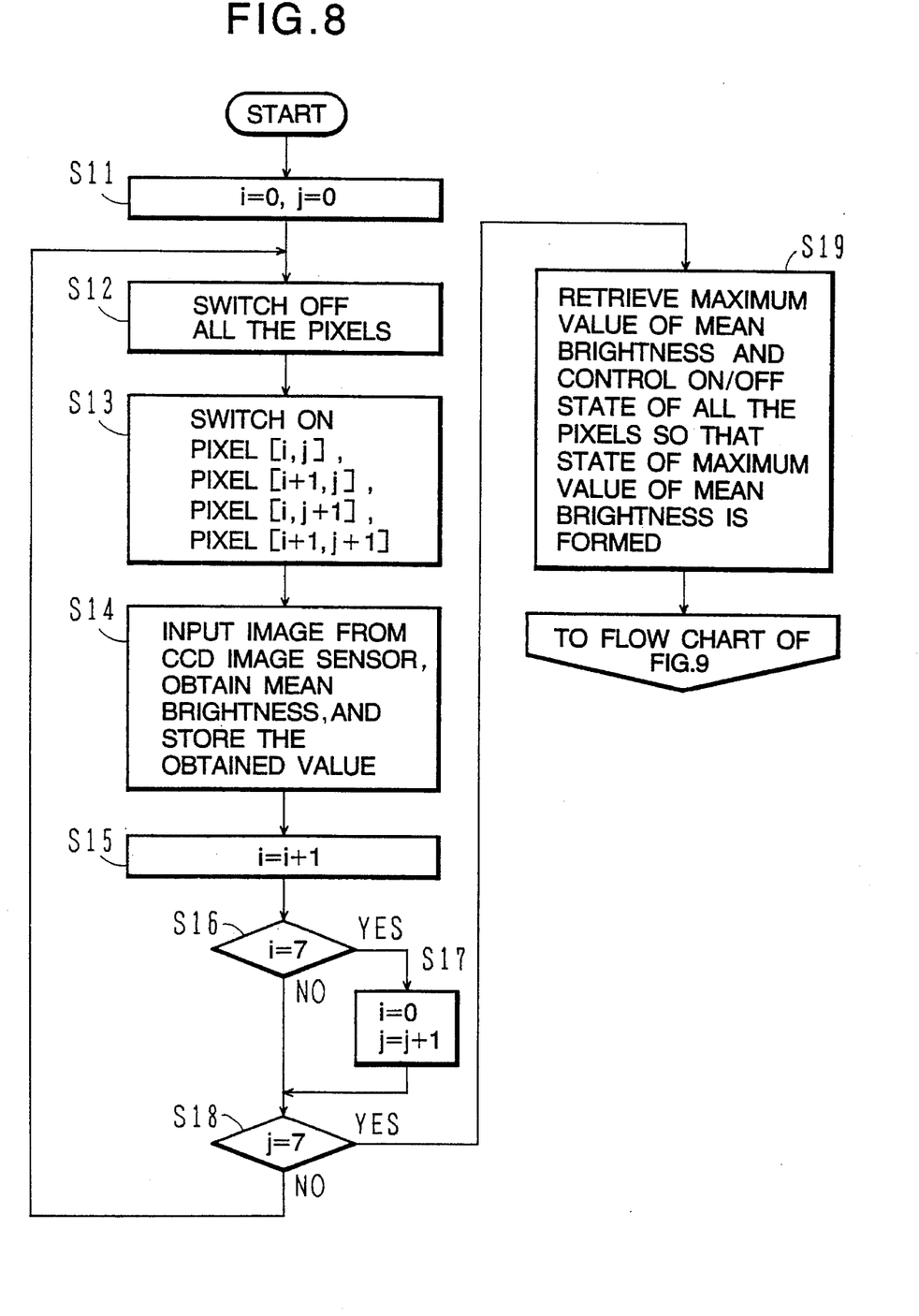
FIG. 8 is a flow chart of a process for determining a setting position of a window in the LCD mask.

The flow chart of FIG. 8 as explained above shows a process for finding out the position of formation of the imaged-point 33 on the LCD mask 26 in accordance with the position of existence of the light point 14 on the screen 11. When the flow chart shown in FIG. 8 is terminated, the situation of the routine goes to the flow chart shown in FIG. 9. The flow chart of FIG. 9 shows a process for obtaining coordinates with respect to the position of existence of the light point 14.

Figure 9:
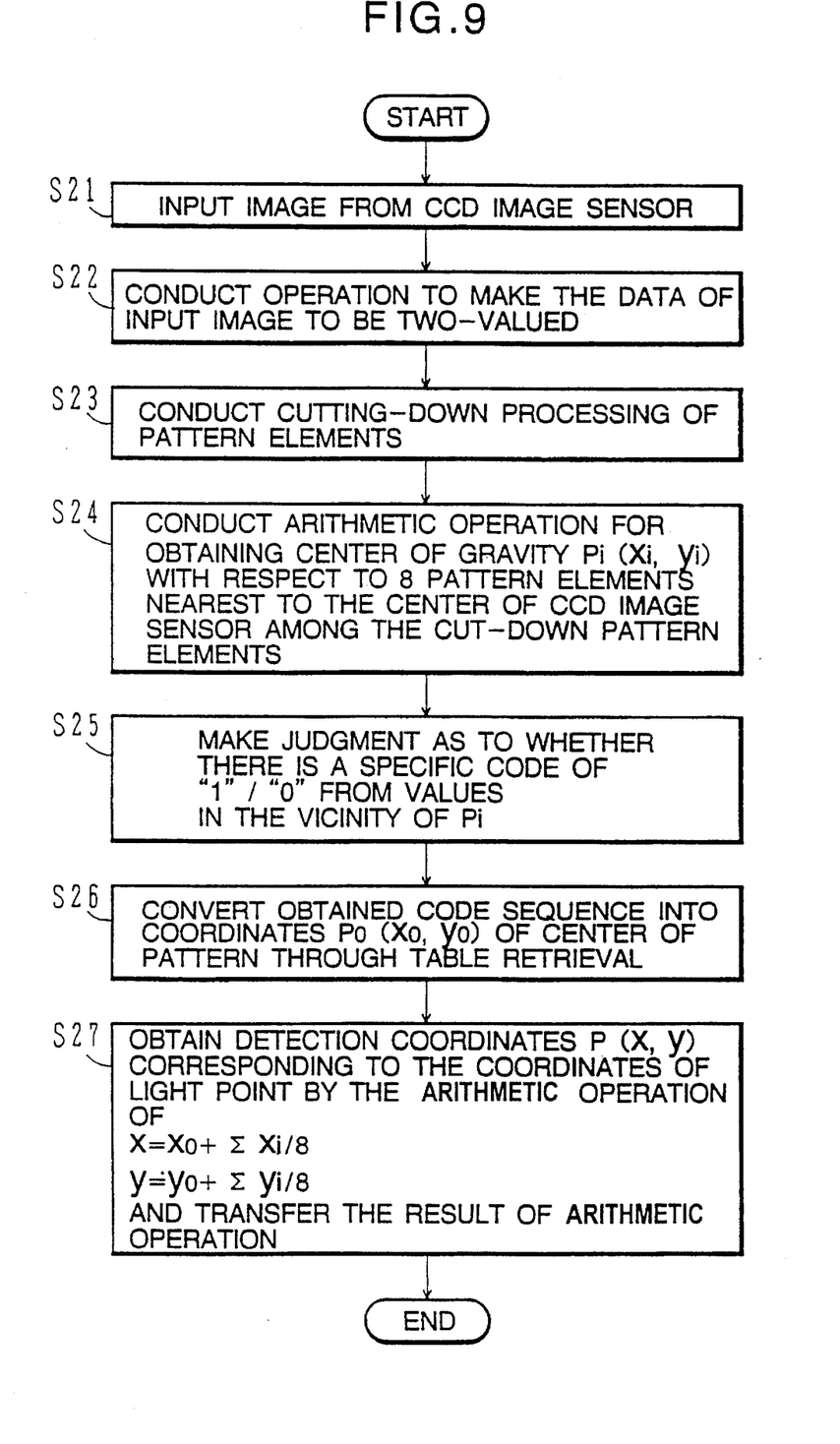
FIG. 9 is a flow chart of a process for detecting the position of the light-emitting point.

In the flow chart shown in FIG. 9, first, light taken-in by the window 45 formed in the place of existence of the imaged-point 33 is converged by the converging lens 25, so that image data obtained by the CCD image sensor 27 are taken into the microcomputer 30 through the image input section 29 (step S21). The image data outputted from the CCD image sensor 27 contains information with respect to a part of the pattern projected onto the light-receiving region of the CCD image sensor 27, for example, as described above with reference to FIG. 6. The input image data are made to be two-valued by the next step S22. A process for cutting down all dots and ring-like dots with respect to the shapes of the dot 41 and the ring-like dot 42 as pattern elements is carried out on the basis of the thus obtained two-valued image data (step S23). By the cutting-down process, data of the positions of existence of the all dots and ring-like dots are obtained. Then, as for the thus cut-down dots 41 and ring-like dots 42, dots 41 and ring-like dots 42 located near the center portion of the light-receiving region (image pickup region) of the CCD image sensor 27 are selected. The number of the selected pattern elements inclusive of dots and ring-like dots is 8 in total, so that each of the pattern elements has a perfect and faultless shape. An arithmetic operation for obtaining the center of gravity is carried out with respect to each of the selected eight pattern elements inclusive of dots 41 and ring-like dots 42 (step S24). Thus, center-of-gravity data Pi (xi, yi) (in which $i$ represents a numerical value of from 1 to 8) is calculated with respect to each of the eight pattern elements inclusive of dots and ring-like dots. The thus calculated center-of-gravity data is stored in the storage section.

After the center-of-gravity data Pi (xi, yi) is obtained with respect to each of the dots and ring-like dots, judgment is made as to whether there exists or not a specific code (constituted by a plurality of digits "1" and "0") from the values of pixels near the center of gravity with respect to each of the center-of-gravity data (step S25). A code sequence can be obtained by the judgment on the code with respect to each of the center-of-gravity data. Further, the coordinates P0 (x0, y0) of the center of the pattern picked up by the light-receiving portion of the CCD image sensor 27 are obtained on the basis of the code sequence and a table prepared in advance, by searching the table (step S26). The table is a table for correlating the code sequence to the coordinates of the center of the pattern. As a result, in the step S26, the code sequence obtained is converted into the coordinates of the center of the pattern.

In the final step S27, the position of the light point 14 on the screen 11 is obtained as coordinates with respect to the light point 14 which is the cause of formation of a part of the pattern picked up by the CCD image sensor 27. The values of $x$ and $y$ in the coordinates P (x, y) of the position of the light point 14 are given by the following equations, respectively.

$$x = x0 + \Sigma xi/8$$

$$y = y0 + \Sigma yi/8$$

The data of the coordinates P (x, y) of the position of the light point 14 detected as described above in the microcomputer 30 are supplied to the computer unit 17 through the RS232C cable 31. The computer unit 17 carries out a necessary processing by using the thus obtained coordinates of the position of the light point 14.

In the optical position detecting unit according to the aforementioned embodiment of the present invention, an optical coordinate input unit is provided on the basis of the structure in which the optical position detecting unit 12 is disposed at a predetermined distance from the screen 11 having a coordinate system set thereon so as to be opposite to the screen 11. In the optical position detecting unit 12, the CCD image sensor 27 having a light-receiving region (image pickup region) constituted by arrangement of a plurality of pixels is used as the image pickup device. Because this embodiment is configured so that coordinate data in a two-dimensional plane are obtained, the light-receiving region is formed as a two-dimensional light-receiving region. Accordingly, a CCD area image sensor is used in this embodiment.

With respect to the CCD image sensor, it is preferable to make the number of pixels be as small as possible, from the point of view of reduction of the cost of the production of the optical position detecting unit. On the other hand, it is preferable to make the resolution or the detecting accuracy of the optical position detecting unit be as high as possible. Although the resolution with respect to detection can be increased if the number of pixels is increased, the increase of the number of pixels is contradictory to the first requirement of reduction of the cost of the products. In this embodiment, therefore, the light 21 coming from the light point 14 is converged to a required degree by using the optical lens system constituted by the imaging lens 23 and the converging lens 25 to thereby heighten detecting sensitivity and reduce the light-receiving region (the number of pixels) of the CCD image sensor 27.

As for the resolution with respect to detection, for example, the pattern plate 24 is preferably disposed in the light point 14 side of the converging lens 25 on the path of the light 21, and the pattern drawn in the pattern plate 24 is used as an encoded scale to thereby maintain desired high resolution through the scale. The pattern plate 24 having a specific pattern (such as an M-plane or the like) drawn as a scale for setting high detecting resolution is used. Further, the number of pixels in the CCD image sensor 27 is determined in accordance with the scale determined by the pattern, so that the number of pixels can be reduced.

In the LCD mask 26, the window 45 is formed by ON/OFF-controlling the plurality of pixels 44 contained in the CCD image sensor 27, so that the light 21 come from the light point 14 is made to pass through the window 45 by moving the window 45 in a predetermined sequence. In the case where the light 21 from the light point 14 is received by the CCD image sensor 27, background light increases when an optical lens is used on the light path, but the influence of background light can be reduced by transmitting the light through the window while limiting the light with the LCD mask 26. The window 45 in the LCD mask 26 functions as a hole for transmitting the light 21 come from the light point 14. Accordingly, the position of formation (the position of existence) of the window 45 in the LCD mask 26 corresponds to a part of the pattern (partial pattern) drawn in the pattern plate 24, so that the position (coordinates) of the light point 14 can be determined uniquely in accordance with the image of the shadow of the partial pattern. Further, in the case where two or more light points are present on the screen 11, the positions of the respective light points can be detected simultaneously by the function of the window 45 moving in the LCD mask 26.

Figure 10A:
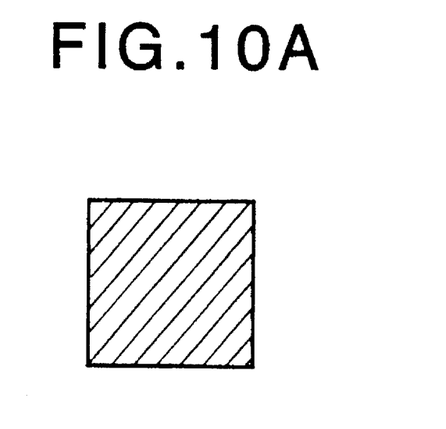
FIGS. 10A and 10B are views of another example of the pattern elements.
Figure 10B:
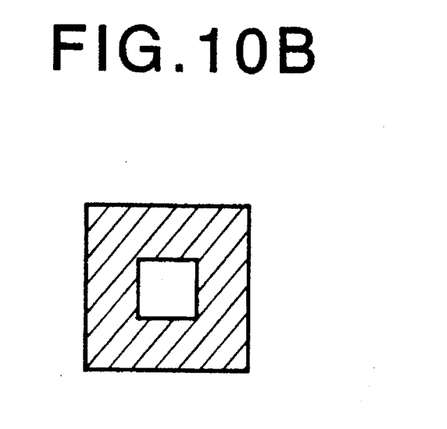
Figure 11A:
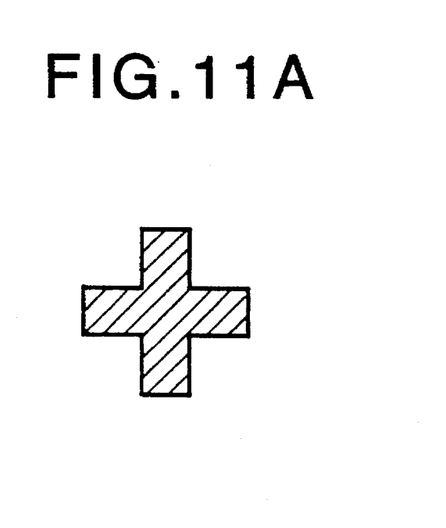
FIGS. 11A and 11B are views of a further example of the pattern elements.
Figure 11B:
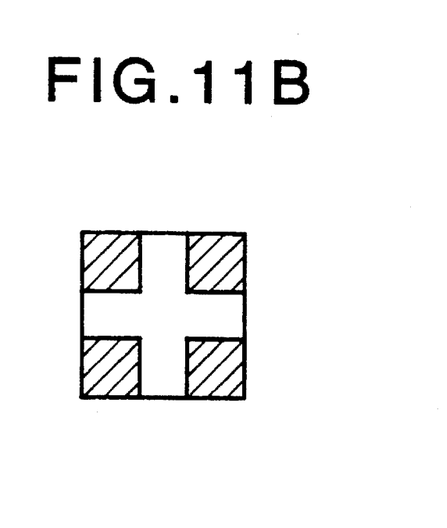

The aforementioned embodiment has shown the case where dots 41 and ring-like dots 42 are used as elements forming a pattern. These pattern elements have an advantage in that the outside of each element can be weighted more heavily than the inside thereof when the center of gravity thereof is calculated. The pattern elements are not limited to such dots 41 and ring-like dots 42. For example, as shown in FIGS. 10A and 10B, rectangular dots 51 smeared all over as light-shielding portions and rectangular ring-like dots 52 can be used instead of the circular dots 41 and the circular ring-like dots 42, respectively. Alternatively, for example, as shown in FIGS. 11A and 11B, pattern elements 53 and 54 using a cross shape can be used instead of the ring-like dots 42. The smeared portions of the pattern elements 53 and 54 serve as light-shielding portions.

Although the embodiment has shown the case where a shadow image is used as the image of the pattern projected onto the light-receiving region of the CCD image sensor 27, the present invention can be applied to a case where the pattern is not formed as a light-shielding portion but formed as a light-transmitting portion so that the image of the pattern can be projected as an image of light.

According to the present invention, the imaging lens and the converging lens are disposed in a predetermined positional relation, by which position detecting resolution with respect to the number of pixels in the image pickup device can be heightened, so that an economical and high-accurate optical position detecting unit can be provided.

Detecting sensitivity can be heightened by the converging function of the converging lens. Further, the number of pixels in the image pickup device can be reduced relatively, so that reduction in size of the optical position detecting unit can be achieved.

The pattern plate in which a pattern having characteristic such as two-dimensional M-sequence characteristic and so on is drawn is provided so that information of the position of the light-emitting point is generated by code information contained in the image of a part of the pattern. Accordingly, the number of pixels in the image pickup device can be reduced.

The masking member having a movable light-transmitting portion is provided, so that the influence of background light can be reduced. In addition, even in the case where two or more light-emitting points are present, the positions of the light-emitting points can be detected simultaneously.

What is claimed is:

1. An optical position detecting unit for optically detecting a position of a freely movable light point comprising:
    an image sensor having a pixel array region configured by a relatively small number of pixels;
    an imaging lens for forming an image of said light point at a position in front of the pixel array region of said image sensor;
    a converging lens disposed between said image sensor and the position of the image of said light point on an optical axis of said imaging lens for converging light coming from said light point onto the pixel array region of said image sensor, the light passing through the image of said light point;
    a transparent optical pattern plate having a pattern containing optical code information uniquely corresponding to the position of said light point on the screen, the plate being disposed between said converging lens and the position of the image of said light point in a plane parallel with the pixel array region of said image sensor, the code information pattern enabling the position of said light point to be determined by means of optical codes included in a region through which the light from said light point passes, said optical codes in the region being projected onto the pixel array region by the converging light coming from said light point onto the pixel array region; and
    signal processing means for processing signals outputted from said image sensor on which said codes are projected onto said pixel array region so as to extract information of the position of said light point by using said codes.

2. The optical position detecting unit of claim 1 further comprising an optical mask disposed near said pattern plate for enabling only a portion of said pattern which contains said code information corresponding to the position of said light point to be incident on the image sensor.

3. The optical position detecting unit of claim 2 wherein said mask includes a variable position visual field for setting said portion of said pattern.

4. The optical position detecting unit of claim 2 wherein said mask is located at a position where the image of said light point is formed.

5. The optical position detecting unit of claim 1 wherein the pixels and pattern are arranged as two-dimensional arrays and said pattern has a two-dimensional M-sequence characteristic.

6. The optical position detecting unit of claim 5 wherein said pattern includes circular dot elements and ring-like dot elements arranged at each intersection of a lattice in a specific sequence.

7. Apparatus for detecting the position of a point optical image, comprising a screen surface from which the image is derived, an optical system located a predetermined distance from the screen surface and positioned to be responsive to the image, the optical system deriving an indication of the image position, and including:
    an image sensor having a pixel array region configured by a relatively small number of pixels;
    an imaging lens for forming an image of said light point at a position in front of the pixel array region of said image sensor;
    a converging lens disposed between said image sensor and the position of the image of said light point on an optical axis of said imaging lens for converging light coming from said light point onto the pixel array region of said image sensor, the light passing through the image of said light point;
    a transparent optical pattern plate having a pattern containing optical code information uniquely corresponding to the position of said light point on the screen, the plate being disposed between said converging lens and the position of the image of said light point in a plane parallel with the pixel array region of said image sensor, the code information pattern enabling the position of said light point to be determined by means of optical codes included in a region through which the light from said light point passes, said optical codes in the region being projected onto the pixel array region by the converging light coming from said light point onto the pixel array region; the apparatus further including signal processing means for processing signals outputted from said image sensor on which said codes are projected onto said pixel array region so as to extract information of the position of said light point by using said codes.

8. The apparatus of claim 7 further comprising an optical source for causing the point optical image to be derived from the screen, the optical source and the screen being spaced from each other so the screen responds to the source.

9. The apparatus of claim 7 further comprising an optical mask disposed near said pattern plate for enabling only a portion of said pattern which contains said code information corresponding to the position of said light point to be incident on the image sensor.

10. The apparatus of claim 8 wherein said mask includes a variable position visual field for setting said portion of said pattern.

11. The apparatus of claim 7 wherein said mask is located at a position where the image of said light point is formed.

12. The apparatus of claim 7 wherein the pixels and patterns are arranged as two-dimensional arrays and said pattern has a two-dimensional M-sequence characteristic.

13. The optical position detecting unit of claim 7 wherein said pattern includes circular dot elements and ring-like dot elements arranged at each intersection of a lattice in a specific sequence.

14. Apparatus for detecting the position of a point optical image on a surface, an optical beam being derived in response to the point optical image being incident on the surface, the optical beam having an axis and path intersecting the position on the surface where the point optical image is incident, the apparatus comprising an optical system remote from the surface for intercepting the beam, the optical system including an optical detecting surface in the beam path, and a transparent optical pattern including optically coded position identifying regions having positions uniquely corresponding to different positions of the point optical image on the surface from which the beam is derived, the pattern being positioned in the beam path between the optical detecting surface and the surface from which the beam is derived so the beam as incident on the optical detecting surface is modified in accordance with the optically coded regions in the beam path, the optical detecting surface causing derivation of a signal having values corresponding to the optically coded regions in the beam path.

15. The apparatus of claim 14 wherein the optical detecting surface is divided into pixels having a certain intercept area for the beam incident on the optical detecting surface, the pattern being such that there are several pixels in the beam path for each optically coded region in the beam path, a signal being derived from each pixel.

16. The apparatus of claim 15 further including a data processor responsive to the signal for deriving an indication of the location of a center of gravity of the point optical image as incident on the optical detecting surface.

17. The apparatus of claim 16 wherein the data processor, after deriving the a center of gravity of the point optical image as incident on the optical detecting surface, converts the signal corresponding to the optically coded regions in the beam path into the positions of the point optical image on the surface from which the beam is derived.

18. The apparatus of claim 17 further including a mask for selectively enabling optical energy from only a portion of the surface from which the point source image is derived to be incident on the optical detecting surface, the data processor controlling the mask position in response to the signal derived from the optical detecting surface.

19. The apparatus of claim 15 wherein the pixels and pattern are arranged as two-dimensional arrays.

20. The apparatus of claim 14 wherein the pattern has a two-dimensional M-sequence characteristic.

21. The apparatus of claim 20 wherein the pattern coded regions have different opacities.

22. The apparatus of claim 21 wherein one type of said regions is a circular dot having the same optical properties throughout its area and another type of said regions is a ring having the same outer diameter as the circular dot and different optical properties in its center and peripheral portions.

23. The apparatus of claim 22 wherein the rings and dots are arranged in a matrix of columns and rows.

24. The apparatus of claim 14 further including a mask for selectively enabling optical energy from only a portion of the surface from which the point source image is derived to be incident on the optical detecting surface, the mask position being controlled in response to the signal derived from the optical detecting surface.

* * * * *